(12) United States Patent
Miura (10) Patent No.: US 6,772,731 B2
(45) Date of Patent: Aug. 10, 2004

(54) VARIABLE CAM ENGINE AND METHOD FOR CONTROLLING THE VARIABLE CAM ENGINE

(75) Inventor: Hajime Miura, Tokyo (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 10/409,098

(22) Filed: Apr. 9, 2003

(65) Prior Publication Data

US 2003/0209228 A1 Nov. 13, 2003

(30) Foreign Application Priority Data

May 10, 2002 (JP) ........................................ 2002-134939

(51) Int. Cl.[7] .............................. F01L 1/34; F02D 13/00; F02P 5/15
(52) U.S. Cl. ................ 123/399; 123/90.17; 123/406.45
(58) Field of Search .......................... 123/90.15, 90.16, 123/90.17, 361, 399, 406.12, 406.45, 406.52, 406.59

(56) References Cited

U.S. PATENT DOCUMENTS

| | | |
|---|---|---|
| 4,960,095 A | 10/1990 | Koike et al. |
| 5,152,267 A | 10/1992 | Komatsu et al. |
| 5,159,905 A | 11/1992 | Sugiuchi et al. |
| 5,168,851 A | 12/1992 | Itoyama et al. |
| 5,195,470 A * | 3/1993 | Ikeura ..................... 123/90.15 |
| 5,347,962 A | 9/1994 | Nakamura et al. |

FOREIGN PATENT DOCUMENTS

| | | |
|---|---|---|
| JP | 6-10747 A | 1/1994 |
| JP | 2765218 B2 | 4/1998 |

\* cited by examiner

*Primary Examiner*—Tony M. Argenbright
(74) *Attorney, Agent, or Firm*—Foley & Lardner LLP (57) ABSTRACT

A variable cam engine with an intake valve, including a first cam shaped to allow an increased intake valve lift and an increased intake valve duration, a second cam shaped to allow a reduced intake valve lift and a reduced intake valve duration, a cam switching mechanism for switching between the first and second cams depending on an engine speed and an engine load, and a control unit programmed to substantially equalize amounts of intake air flowing into the engine before and after switching from the first cam to the second cam, and programmed to determine a first ignition timing when the second cam is operated and a second ignition timing when the first cam is operated, and advance the first ignition timing relative to the second ignition timing upon switching from the first cam to the second cam.

21 Claims, 10 Drawing Sheets

VARIABLE CAM ENGINE AND METHOD FOR CONTROLLING THE VARIABLE CAM ENGINE

BACKGROUND OF THE INVENTION

The present invention relates to a variable cam engine having cams selectively operated for driving an engine valve depending on the engine operating conditions.

U.S. Pat. No. 5,152,267 (corresponding to Japanese Patent No. 2765218) discloses a variable cam engine adapted for absorbing the torque fluctuation caused upon switching between engine valve driving cams, by retarding an ignition timing. Japanese Patent Application First Publication No. 6-10747 discloses a variable cam engine in which ignition timing (spark) and a fuel injection amount are controlled depending on the change in intake air amount which is caused upon switching between engine valve driving cams.

SUMMARY OF THE INVENTION

The above-described related arts, however, do not take into consideration, maximum spark for best torque or fuel economy (MBT) which varies depending on the combustion state before and after switching the cams.

It would therefore be desirable to provide a variable cam engine capable of providing an optimal ignition timing after switching between cams and serving for improving fuel economy and emission control.

In one aspect of the present invention, there is provided a variable cam engine with an intake valve, the engine comprising:

a first cam shaped to allow an increased intake valve lift and an increased intake valve duration;

a second cam shaped to allow a reduced intake valve lift and a reduced intake valve duration;

a cam switching mechanism for switching between the first and second cams depending on an engine speed and an engine load; and a control unit programmed to substantially equalize amounts of intake air flowing into the engine before and after switching from the first cam to the second cam, and programmed to determine a first ignition timing when the second cam is operated and a second ignition timing when the first cam is operated, and advance the first ignition timing relative to the second ignition timing upon switching from the first cam to the second cam.

In a further aspect of the present invention, there is provided a method for controlling a variable cam engine including a throttle valve, an intake valve, a first cam shaped to allow an increased intake valve lift and an increased intake valve duration, and a second cam shaped to allow a reduced intake valve lift and a reduced intake valve duration, the method comprising:

determining whether the engine is operated in a predetermined range depending on an engine speed and an engine load;

switching from the first cam to the second cam when the engine is operated in the predetermined range;

calculating a target opening degree of the throttle valve at which amounts of intake air flowing into the engine before and after the switching operation are substantially equalized;

controlling the throttle valve to change an opening degree to the target opening degree;

calculating a first ignition timing and a second ignition timing, the first ignition timing being advanced relative to the second ignition timing; and providing ignition at the first ignition timing when the engine is operated in the predetermined range, and ignition at the second ignition timing when the engine is operated out of the predetermined range.

DETAILED DESCRIPTION OF THE PREFERRED EMBODIMENT

Figure 6:
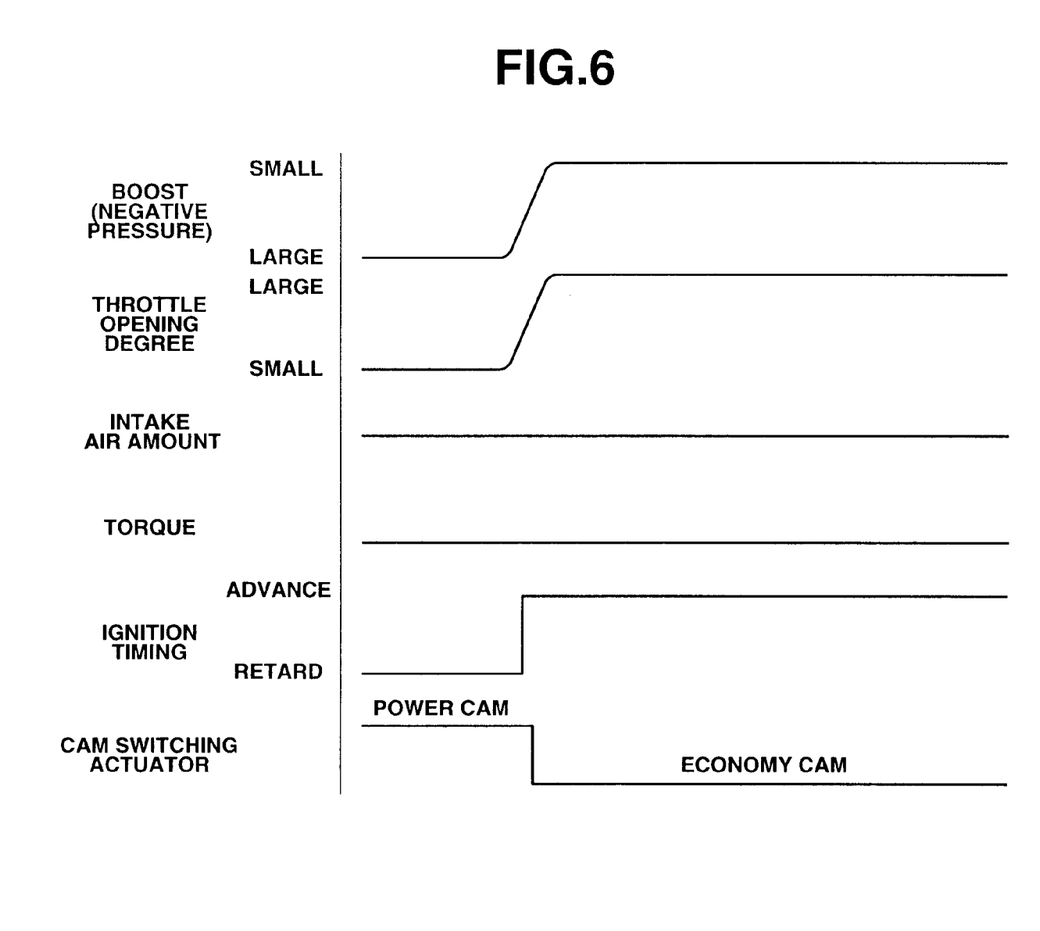
FIG. 6 is a timing chart illustrating engine operating characteristics when switching from the power cam to the economy cam is performed.
Figure 7:
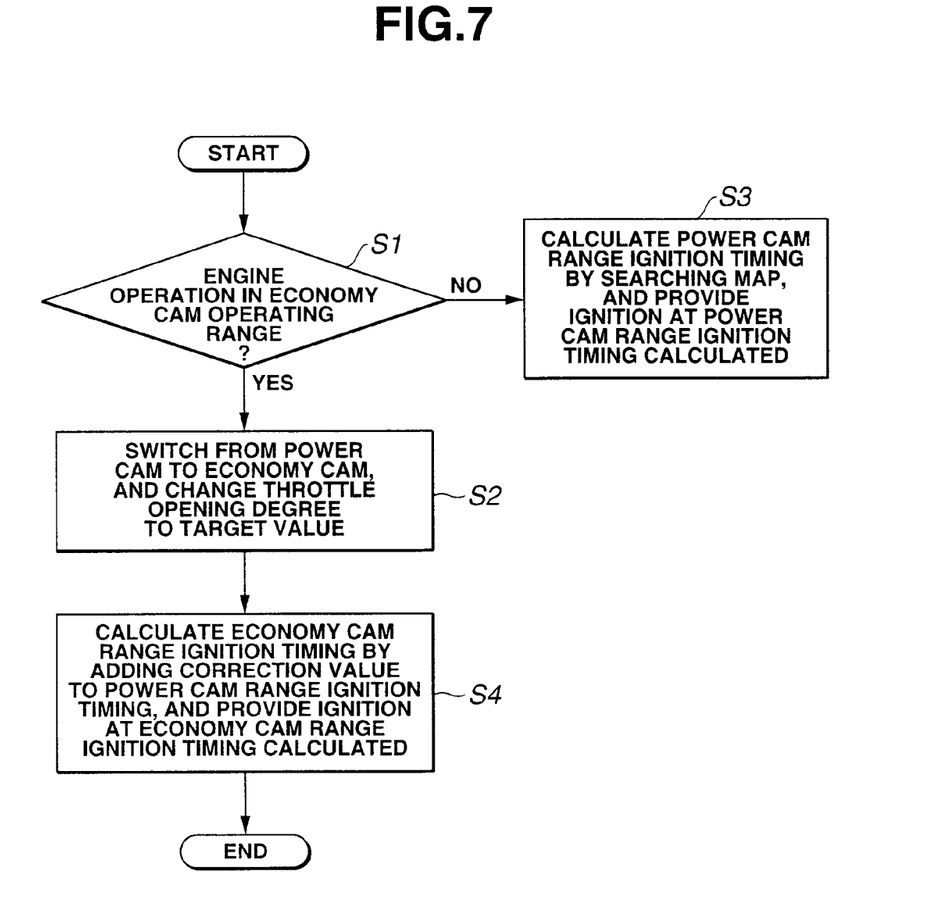
FIG. 7 is a flowchart illustrating control logic of the first embodiment of the variable cam engine.
Figure 8:
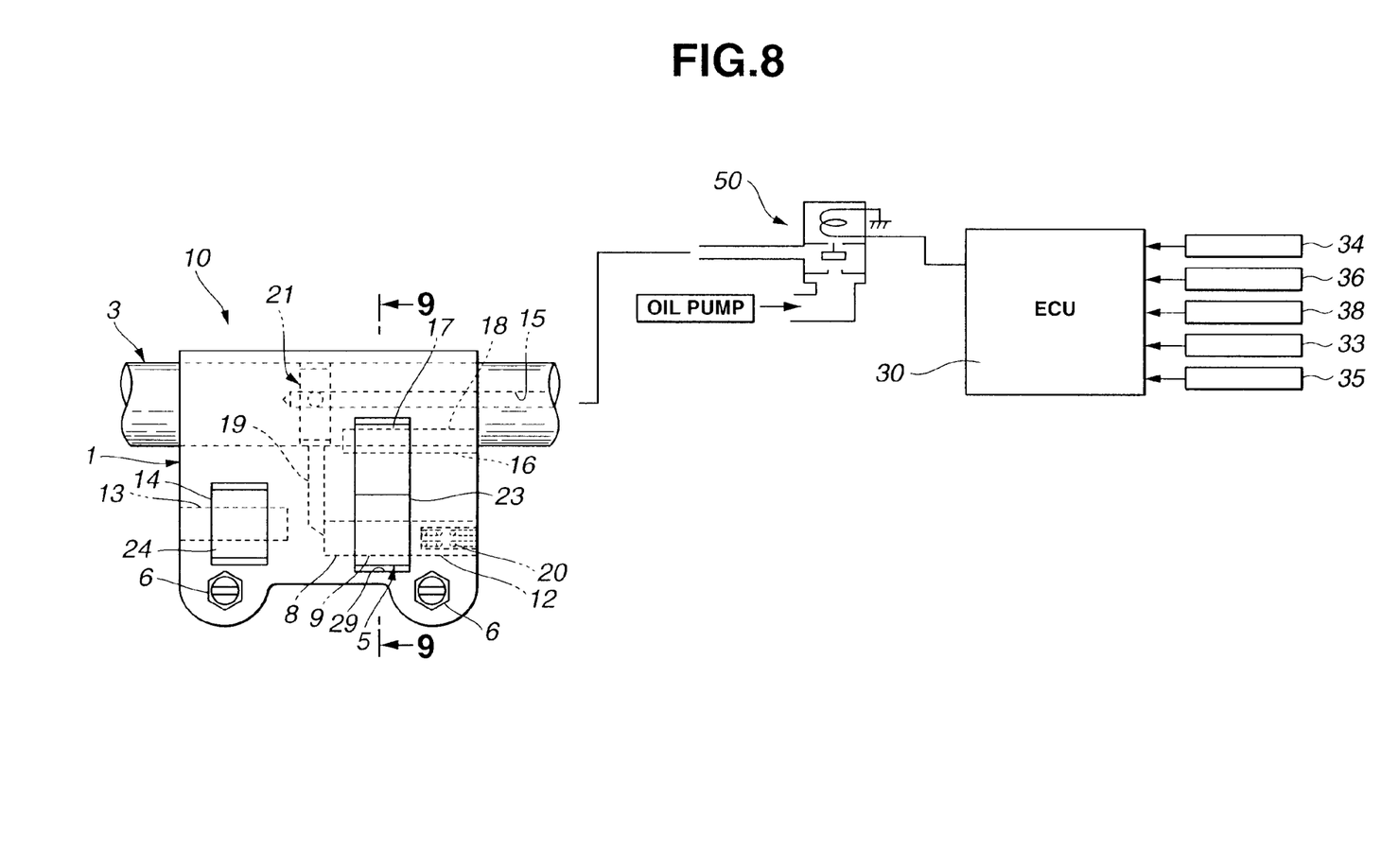
FIG. 8 is a schematic diagram illustrating a construction of the variable cam engine including a cam switching mechanism shown in plan view.
Figure 9:
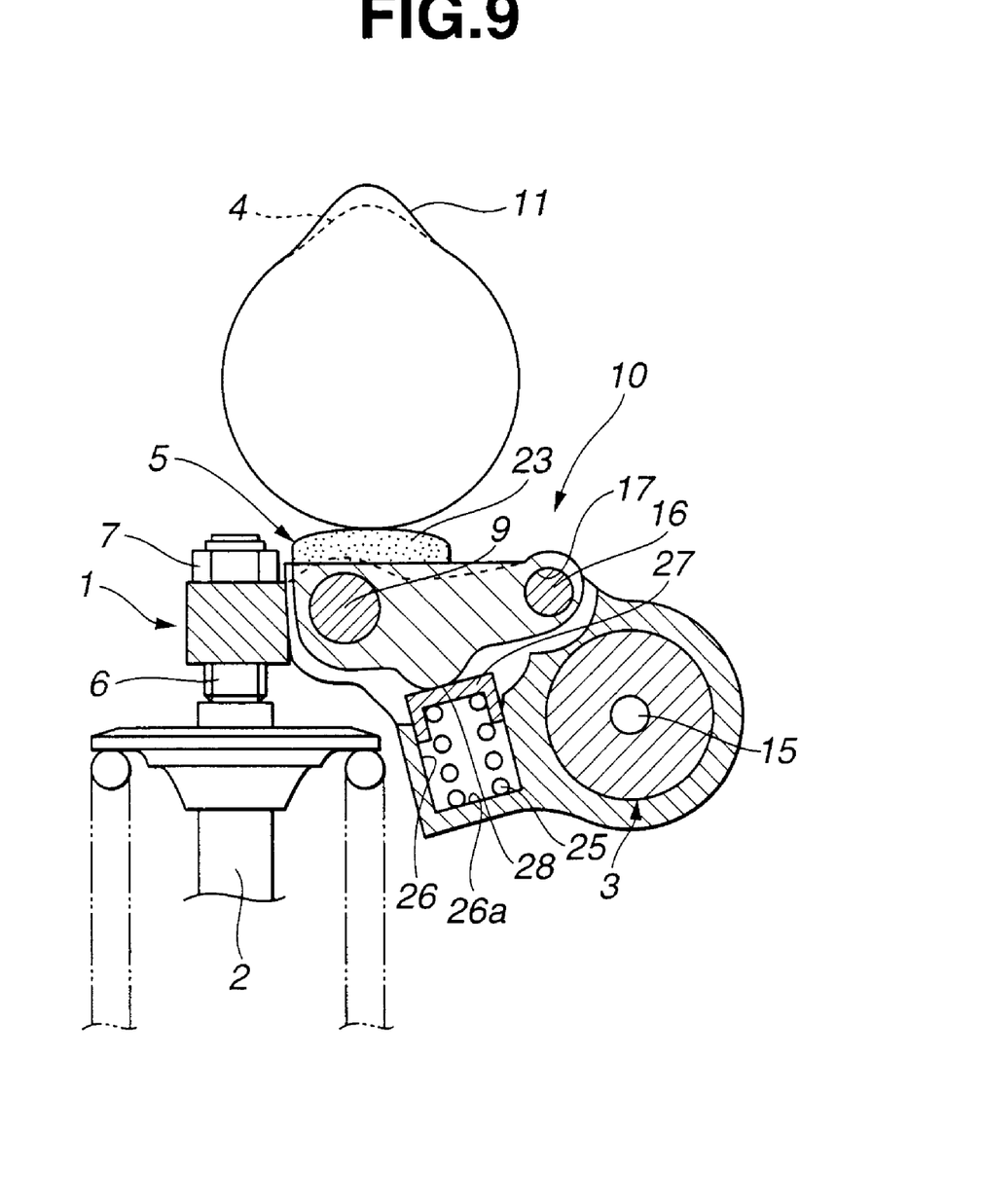
FIG. 9 is a section of the cam switching mechanism, taken along line 9—9 of FIG. 8.

Referring now to FIGS. 1–9, a variable cam engine of a first embodiment of the present invention is explained. As illustrated in FIGS. 8 and 9, the variable cam engine includes two cams 4 and 11 and cam switching mechanism 10 therefor. Specifically, as shown in FIG. 9, the variable cam engine includes intake valves 2, first cam (power cam) 11 and second cam (economy cam) 4. Economy cam 4 provides a small intake valve lift and a small intake valve duration of intake valve 2. Power cam 11 provides a large intake valve lift and a large intake valve duration of intake valve 2. Economy cam 4 and power cam 11 are arranged in series and coaxially on a common cam shaft. Switching between power cam 11 and economy cam 4 is performed by cam switching mechanism 10. Cam switching mechanism 10 includes main rocker arm 1 for two intake valves 2 of each of engine cylinders. Main rocker arm 1 having a generally rectangular shape in plan view as shown in FIG. 8, has one end pivotally supported on an engine cylinder head via main rocker shaft 3. The other end of main rocker arm 1 is contacted with a stem head of each of intake valves 2 through adjust screw 6 and nut 7.

As illustrated in FIG. 8, roller 14 is rotatably mounted to main rocker arm 1 via shaft 13, which comes into rolling contact with economy cam 4. Sub-rocker arm 5 is arranged in axially spaced relation to roller 14 and pivotally mounted to main rocker arm 1. Sub-rocker arm 5 has one end pivotally supported on sub-rocker shaft 16. Sub-rocker shaft 16 is slidably fitted into hole 17 formed in sub-rocker arm 5 and press-fitted into hole 18 formed in main rocker arm 1. Sub-rocker arm 5 is free from contact with intake valve 2 and formed with cam follower 23 which is in contact with power cam 11. Cam follower 23 upwardly projects from an upper surface of sub-rocker arm 5 as shown in FIG. 9. Spring 25 is installed in recess 26 which is formed in main rocker arm 1 on the lower side of sub-rocker arm 5. One end of spring 25 is seated on bottom 26a of recess 26, and an opposite end thereof is seated on spring retainer 27 slidably engaged in recess 26. Spring 25 urges spring retainer 27 onto follower portion 28 of sub-rocker arm 5 to thereby bias cam follower 23 toward power cam 11.

In order to selectively lock the relative pivot motion of main rocker arm 1 and sub-rocker arm 5, the following arrangement is employed. That is, three plungers 8, 9 and 12 are coaxially arranged so as to slidably engage three bore portions which are formed in main rocker arm 1 and sub-rocker arm. The three bore portions coaxially extend in main rocker arm 1 and sub-rocker arm 5 and cooperate to form an integral bore. Hydraulic passage 15 extending in main rocker shaft 3 is connected with hydraulic passages 21 and 19 extending in main rocker arm 1. Hydraulic passage 19 is open to one end of the integral bore to which plunger 8 is opposed. Return spring 20 is installed at the other end of the integral bore and biases plunger 12 toward plungers 8 and 9. Hydraulic passage 15 is connected to an oil pump via cam switching actuator 50. In this embodiment, cam switching actuator 50 is an electromagnetically operated valve. Cam switching actuator 50 is electronically connected to engine control unit (ECU) 30.

When a hydraulic pressure introduced to the one end of the integral bore via hydraulic passages 15, 21 and 19 is low, plungers 8 and 9 are accommodated in main rocker arm 1 and sub-rocker arm 5, respectively, due to the biasing force of return spring 20. In this state, the relative pivot motion of main rocker arm 1 and sub-rocker arm 5 is allowed. On the other hand, the hydraulic pressure introduced to the one end of the integral bore is increased, plungers 8 and 9 are urged against the biasing force of return spring 20 and positioned such that each of plungers 8 and 9 is engaged in the adjacent two bore portions of main rocker arm 1 and sub-rocker arm 5. In this state, the relative pivot motion of main rocker arm 1 and sub-rocker arm 5 is locked.

Figure 3:
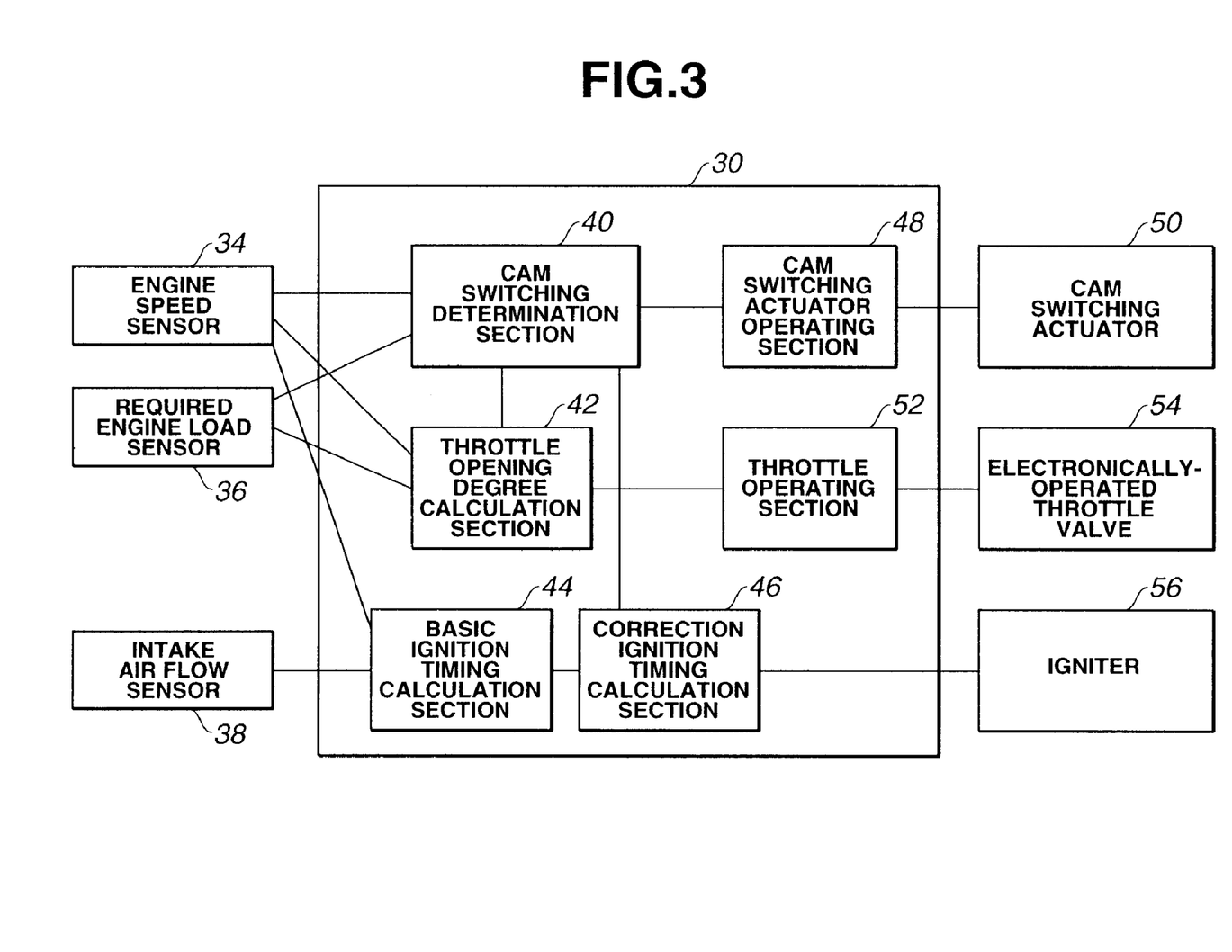
FIG. 3 is a block diagram of a first embodiment of the variable cam engine of the present invention.

A plurality of sensors are connected to ECU 30. The sensors includes engine speed sensor 34, engine load sensor 36, intake air flow sensor 38, water temperature sensor 33, and oil temperature sensor 35. Engine speed sensor 34 senses engine speed, i.e., the number of engine revolution, and generates a signal indicative of the sensed engine speed. Engine speed sensor 34 may be a crank angle sensor. Required engine load sensor 36 senses a required engine load input by a vehicle driver and generates a signal indicative of the required engine load sensed. Required engine load sensor 36 may be an accelerator position sensor sensing a depression amount of an accelerator and generates a signal indicative of the depression amount sensed. Intake air flow sensor 38 senses an amount of intake air flowing into a combustion chamber of the engine and generates a signal indicative of the intake air amount sensed. Intake air flow sensor 38 may be an intake airflow meter. Water temperature sensor 33 and oil temperature sensor 35 detect an engine cooling water temperature and an engine oil temperature, respectively. ECU 30 receives the signals generated from the sensors and processes the signals to determine engine operating conditions. Depending on the engine operating conditions, ECU 30 executes various controls including controls of cam switching, a throttle opening degree and ignition timing, as explained later.

Figure 1:
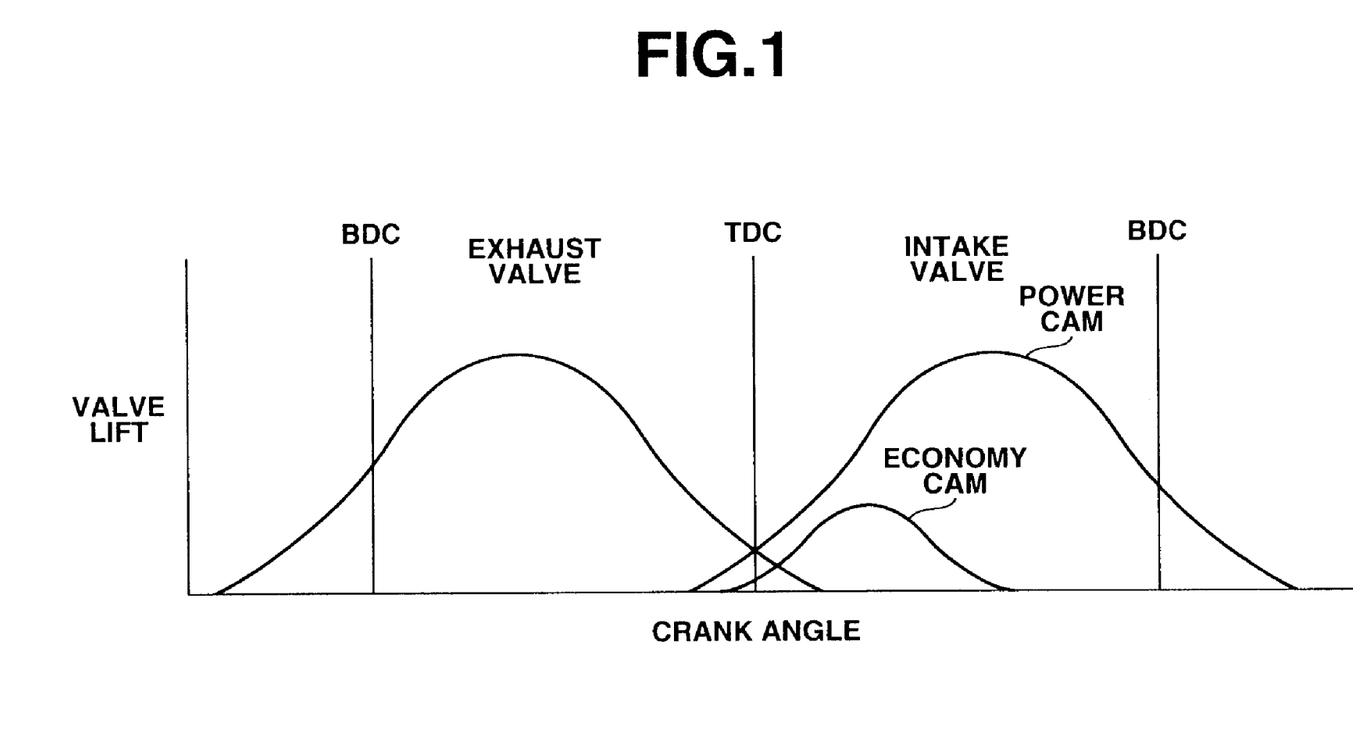
FIG. 1 is a graph illustrating a valve lift characteristic curve of a power cam and an economy cam of a variable cam engine of the present invention.

FIG. 1 illustrates intake valve lift and intake valve duration characteristics of economy cam 4 and power cam 11. Economy cam 4 is shaped to allow a reduced intake valve lift, for instance, about 1–4 mm, and a reduced intake valve duration, for instance, about 100–160 degrees of crank angle. Power cam 11 is shaped to allow an increased intake valve lift, for instance, about 7–11 mm, and an increased intake valve duration, for instance, about 210–260 degrees of crank angle.

Figure 2:
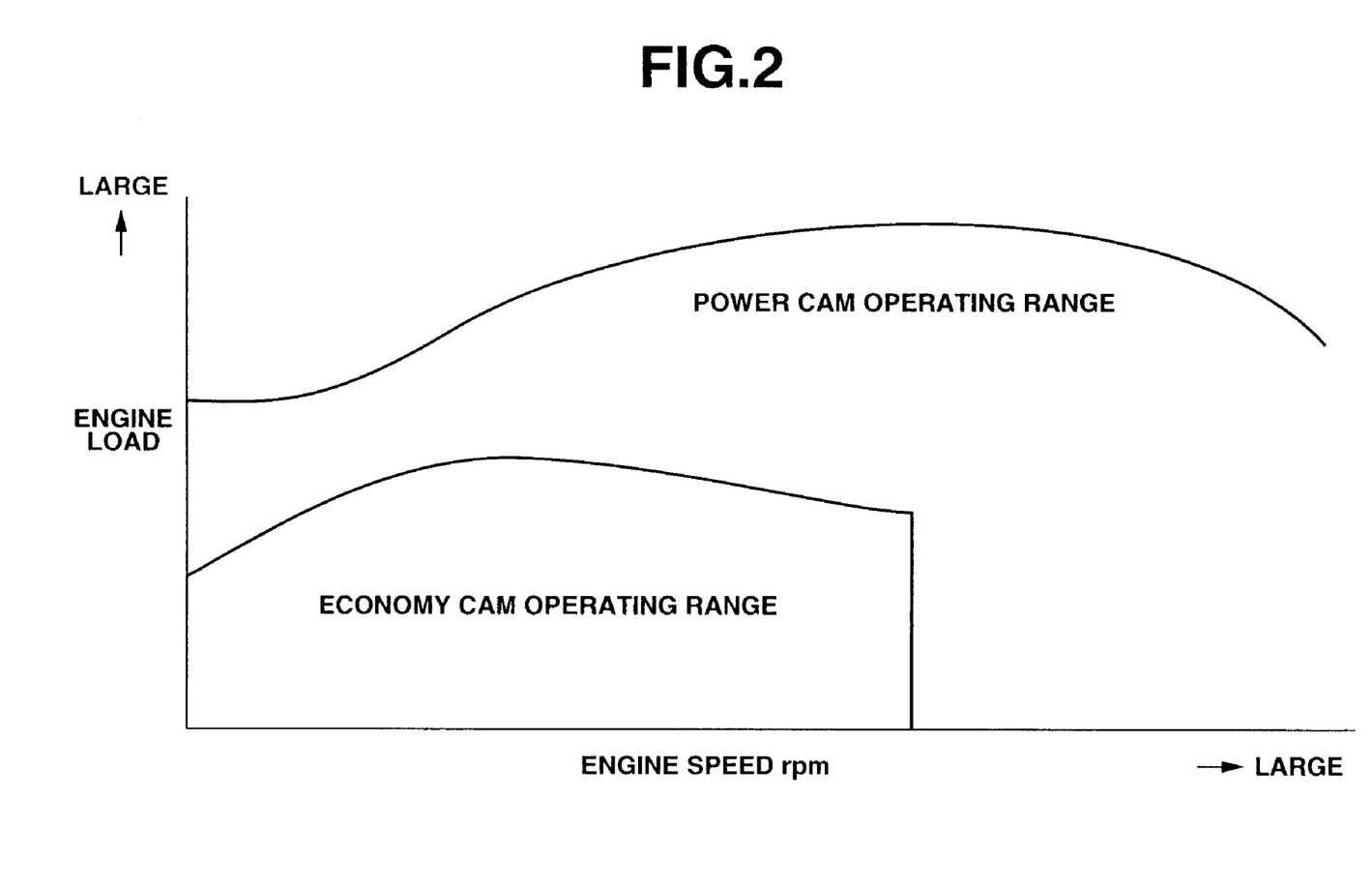
FIG. 2 is a diagram illustrating cam operating ranges preset based on operating conditions of the variable cam engine.

FIG. 2 illustrates an economy cam operating range and a power cam operating range which are determined depending on engine speed and engine load. In the economy cam operating range, economy cam 4 is selected and operated. In the power cam operating range, power cam 11 is selected and operated. Generally, in the economy cam operating range, the engine speed is relatively low and the engine load is relatively small. In contrast, in the power cam operating range, the engine speed is relatively high and the engine load is relatively large. Switching between economy cam 4 and power cam 11 is conducted when the engine operation shifts between the economy cam operating range and the power cam operating range.

Referring now to FIG. 3, ECU 30 is explained. ECU 30 is programmed to substantially equalize amounts of intake air flowing into the engine before and after switching from power cam 11 to economy cam 4, and programmed to determine a first ignition timing when economy cam 4 is operated and a second ignition timing when power cam 11 is operated, and advance the first ignition timing relative to the second ignition timing upon switching from power cam 11 to economy cam 4. ECU 30 may be a microcomputer including a central processing unit (CPU), input and output ports (I/O), a read-only memory (ROM) as an electronic storage medium for executable programs and calibration values, a random access memory (RAM), a keep alive memory (KAM), and a common data bus. As illustrated in FIG. 3, ECU 30 includes cam switching determination section 40, throttle opening degree calculation section 42, basic ignition timing calculation section 44, correction ignition timing calculation section 46, cam switching actuator operating section 48, and throttle operating section 52.

Cam switching determination section 40 determines which cam of economy cam 4 and power cam 11 must be selected and operated, on the basis of the signals indicative of the engine speed and the required engine load, which are generated by engine speed sensor 34 and required engine load sensor 36. Cam switching determination section 40 develops a signal indicative of the determination. Cam switching actuator operating section 48 develops a control signal based on the signal from cam switching determination section 40 and transmits the control signal to cam switching actuator 50. In response to the control signal, cam switching actuator 50 operates cam switching mechanism 10 at a predetermined timing.

Throttle opening degree calculation section 42 calculates a target opening degree of electronically-operated throttle valve 54 on the basis of the signals indicative of the engine speed and the required engine load. At the target opening degree, the amounts of intake air flowing into the engine before and after switching from power cam 11 to economy cam 4 are substantially equal to each other, and a target torque is produced. Throttle opening degree calculation section 42 develops a signal indicative of the target opening degree calculated. Throttle operating section 52 develops a control signal based on the signal from throttle opening degree calculation section 42 and transmits the control signal to electronically-operated throttle valve 54. In response to the control signal, throttle valve 54 is controlled so as to change the opening degree to the target value calculated by throttle opening degree calculation section 42.

Figure 4:
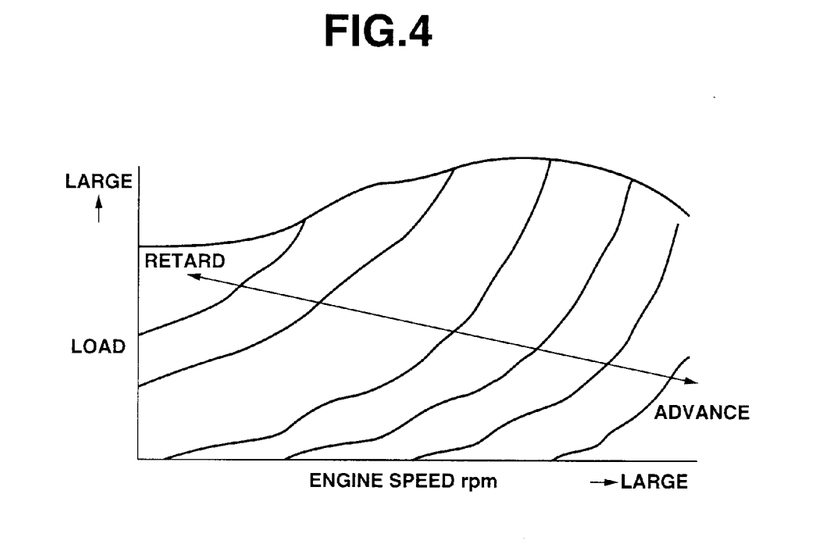
FIG. 4 is a map used for calculating a basic ignition timing in a power cam operating range.

Basic ignition timing calculation section 44 calculates a basic ignition timing (hereinafter referred to as a power cam range ignition timing) in response to the signal from cam switching determination section 40, which indicates that the engine is operated in the power cam operating range. Basic ignition timing calculation section 44 stores a map, shown in FIG. 4, illustrating the power cam range ignition timing relative to engine speed and engine load. Basic ignition timing calculation section 44 calculates the power cam range ignition timing using the map, on the basis of the signals indicative of the engine speed and the intake air amount, which are respectively generated by engine speed sensor 34 and intake air flow sensor 38. Basic ignition timing calculation section 44 develops a signal indicative of the power cam range ignition timing calculated.

Figure 5:
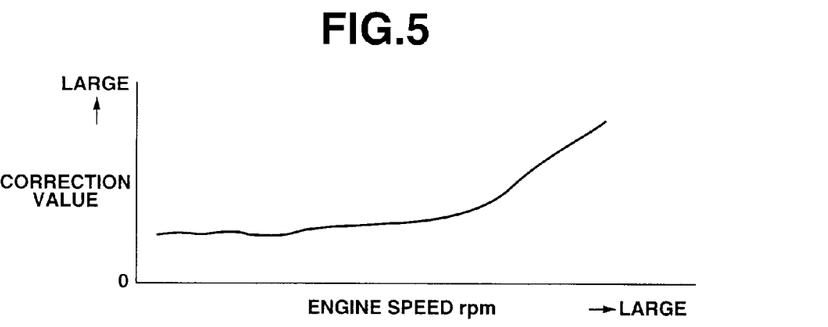
FIG. 5 is a table used for calculating a correction ignition timing in an economy cam operating range.

In response to the signal from cam switching determination section 40, indicating that the engine is operated in the economy cam operating range, correction ignition timing calculation section 46 calculates a correction ignition timing (hereinafter referred to as an economy cam range ignition timing) on the basis of the power cam range ignition timing calculated at basic ignition timing calculation section 44. Specifically, correction ignition timing calculation section 46 stores a table, shown in FIG. 5, illustrating a correction value preset based on engine speed. As illustrated in FIG. 5, as the engine speed becomes higher, the correction value increases. Correction ignition timing calculation section 46 determines the correction value using the table on the basis of the engine speed and calculates the economy cam range ignition timing by adding the correction value thus determined to the power cam range ignition timing. Correction ignition timing calculation section 46 develops a signal indicative of the economy cam range ignition timing calculated.

Igniter 56 receives the signal indicative of the power cam range ignition timing calculated at basic ignition timing calculation section 44 and the signal indicative of the economy cam range ignition timing calculated at correction ignition timing calculation section 46, and provides ignition within an engine combustion chamber at the ignition timing based on the signals. Namely, when the engine is operated in the power cam operating range, igniter 56 provides ignition at the power cam range ignition timing. On the other hand, when the engine is operated in the economy cam operating range, igniter 56 provides ignition at the economy cam range ignition timing advanced by the correction value with respect to the power cam range ignition timing.

Here, the following cases (1) and (2) are taken into account in which switching from the power cam to the economy cam is conducted while keeping almost equal torque of the engine:

(1) changing from the power cam operating range to the economy cam operating range upon a slow deceleration operation (almost normal operation) of the vehicle;

(2) switching from the power cam to the economy cam due to increase in engine temperature (oil and water temperature) in the case of an engine designed to select the power cam in the start-up state with low engine temperature, use the power cam in all operating ranges until the engine temperature satisfies such a temperature condition as to allow changeover between the power cam and the economy cam, and select the economy cam after the engine temperature satisfies the temperature condition.

It is recognized that upon an engine operation with the economy cam providing a reduced intake valve lift, there occur a reduced tumble flow of an air-fuel mixture and a remarkably retarded combustion thereof within the combustion chamber. Even when substantially equal torque and intake air amount are provided upon engine operation using the economy cam and upon engine operation using the power cam, there occur MBTs different between the engine operations because of the intake valve lift characteristics of the economy cam and the power cam. Further, the difference in combustion is caused due to reduction of tumble intensity and retardation of a main combustion period, so that as the engine speed becomes higher, the influence of the combustion difference will become more remarkable. In addition, as the engine speed becomes higher, the difference between the MBTs will increase.

From the above consideration, in this embodiment, when switching from the power cam to the economy cam is conducted, electronically-operated throttle valve 54 is controlled so as to increase the opening degree such that the amount of intake air flowing into the engine before the switching becomes substantially equal to the amount of intake air flowing thereinto after the switching. Further, the ignition timing determined when the economy cam is selected and operated is advanced relative to the ignition timing determined when the power cam is selected and operated. FIG. 6 shows a relation between boost, throttle opening degree, intake air amount, torque and ignition timing, upon the switching from the power cam to the economy cam. Meanwhile, to be precise, the intake air amount provided after the switching will be slightly decreased due to improved fuel economy.

Specifically, when cam switching determination section 40 judges that the switching from the power cam to the economy cam must be conducted, throttle opening degree calculation section 42 calculates the target opening degree of throttle valve 54 at which the amount of intake air flowing into the engine before the switching is substantially equal to the amount of intake air flowing thereinto after the switching. Then, throttle operating section 52 controls throttle valve 54 to change the opening degree to the target value calculated by throttle opening degree calculation section 42. On the other hand, the power cam range ignition timing is calculated by searching the power cam range ignition timing map stored in basic ignition timing calculation section 44. The economy cam range ignition timing is calculated by adding the correction value to the power cam range ignition timing. The correction value is calculated by searching the table stored in correction ignition timing calculation section 46. As a result, the economy cam range ignition timing advanced relative to the power cam range ignition timing by the correction value, is obtained.

The variable cam engine of the present invention can always provide an optimal ignition timing irrespective of the cam selected. This serves for improving the fuel economy and the emission. Further, the economy cam range ignition timing can be obtained by simply adding the correction value to the power cam range ignition timing calculated based on the map. This serves for minimizing storage capacity of ECU 30. Further, in view of the difference between the MBT upon the power cam range operation and the MBT upon the economy cam range operation, the economy cam range ignition timing can be further advanced as the engine speed increases. This serves for more accurately calculating the economy cam range ignition timing.

Next, referring to FIG. 7, a flow of the control implemented by ECU 30 of FIG. 3 is explained. Logic flow starts and goes to block S1 where it is determined or judged whether the engine is operated in a predetermined range depending on the engine speed and the engine load. The predetermined range is a range where the engine load and the engine speed are decreased. Specifically, at block S1, an interrogation is made whether or not an engine operating condition is in the economy cam operating range in which economy cam 4 is to be operated. This determination is conducted based on the engine speed and the required engine load which are detected by sensors 34 and 36 of FIG. 3. If, at block S1, the interrogation is in affirmative, indicating that the engine operating condition is in the economy cam operating range, the logic flow goes to block S2. At block S2, switching from power cam 11 to economy cam 4 is conducted, and throttle valve 54 is controlled so as to change the opening degree to the target value at which the target torque is produced. The logic flow then goes to block S4. At block S4, the economy cam range ignition timing is calculated based on the power cam range ignition timing calculated using the map of FIG. 4, and ignition is provided within the combustion chamber at the economy cam range ignition timing calculated. Specifically, the economy cam range ignition timing is calculated by adding the correction value determined using the table of FIG. 5, to the power cam range ignition timing. If, at block S1, the interrogation is in negative, indicating that the engine operating condition is out of the economy cam operating range, namely, the engine operating condition is in the power cam operating range, the logic flow goes to block S3. At block S3, the power cam range ignition timing is calculated by searching the map of FIG. 4, and ignition is provided within the combustion chamber at the power cam range ignition timing calculated. Meanwhile, upon switching from the economy cam to the power cam with keeping substantially equal torque, the power cam range ignition timing is determined merely based on the map of FIG. 4 without using the correction value.

Figure 10:
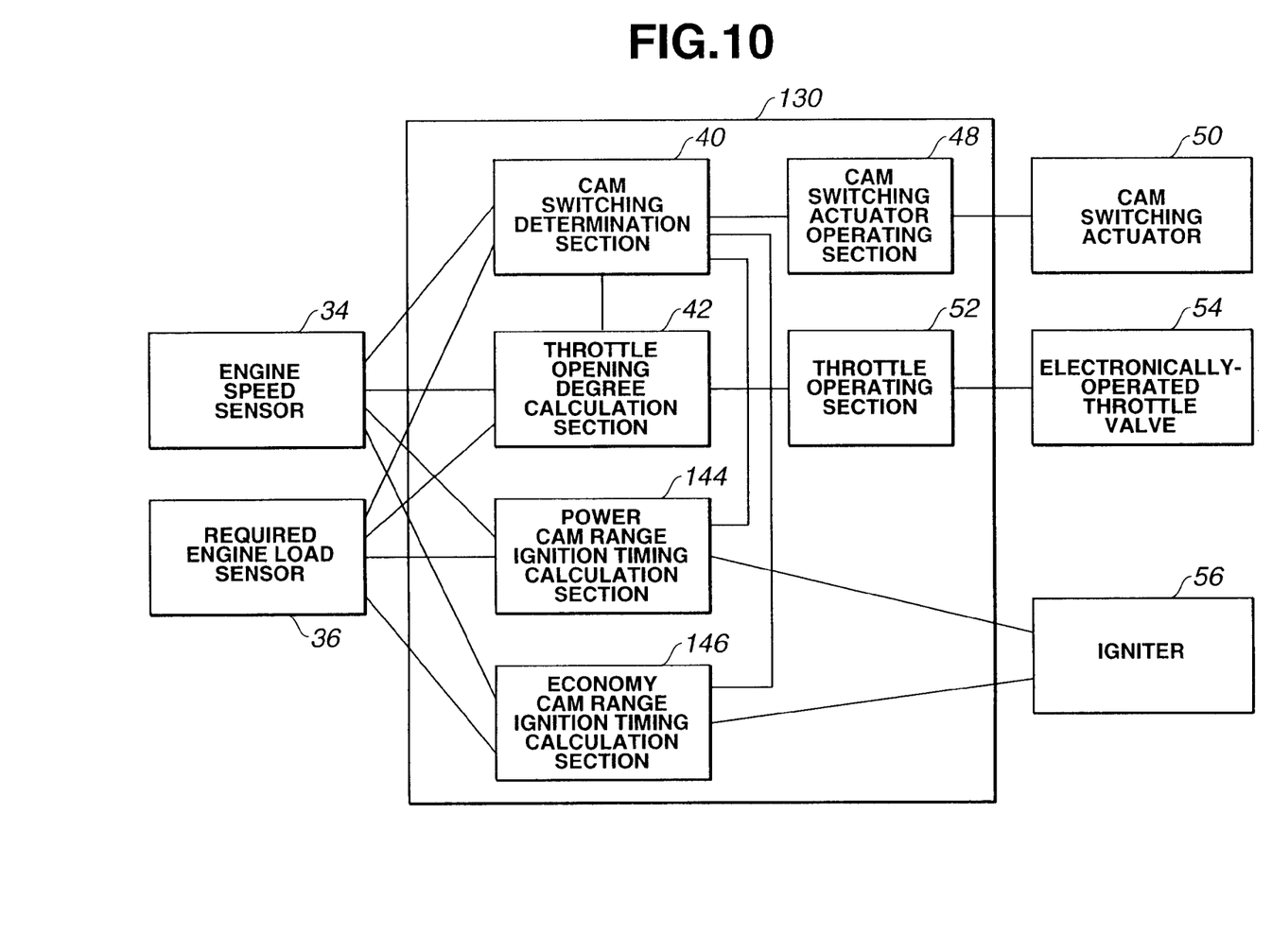
FIG. 10 is a block diagram of a second embodiment of the variable cam engine of the present invention.

Referring to FIG. 10, ECU 130 of a second embodiment of the variable cam engine of the present invention is explained. As illustrated in FIG. 10, ECU 130 includes power cam range ignition timing calculation section 144 and economy cam range ignition timing calculation section 146 which differ from basic ignition timing calculation section 44 and correction ignition timing calculation section 46 of ECU 30 of the first embodiment, respectively. Power cam range ignition timing calculation section 144 calculates a power cam range ignition timing in response to the signal from cam switching determination section 40, which indicates that an engine operating condition is in the power cam operating range. Power cam range ignition timing calculation section 144 calculates the power cam range ignition timing on the basis of the engine speed and the required engine load detected by sensors 34 and 36. Economy cam range ignition timing calculation section 146 calculates an economy cam range ignition timing in response to the signal from cam switching determination section 40, which indicates that an engine operating condition is in the economy cam operating range. Economy cam range ignition timing calculation section 146 calculates the economy cam range ignition timing on the basis of the engine speed and the required engine load detected by sensors 34 and 36. The respective calculations of the power cam range ignition timing and the economy cam range ignition timing are independently performed using ignition timing maps which are stored in ignition timing calculation sections 144 and 146, respectively. The economy cam range ignition timing is advanced relative to the power cam range ignition timing. As the engine speed becomes higher, the economy cam range ignition timing is further advanced. In the second embodiment, the power cam range ignition timing and the economy cam range ignition timing can be individually calculated. This serves for enhancing accuracy in calculating the power cam range ignition timing and the economy cam range ignition timing.

Figure 11:
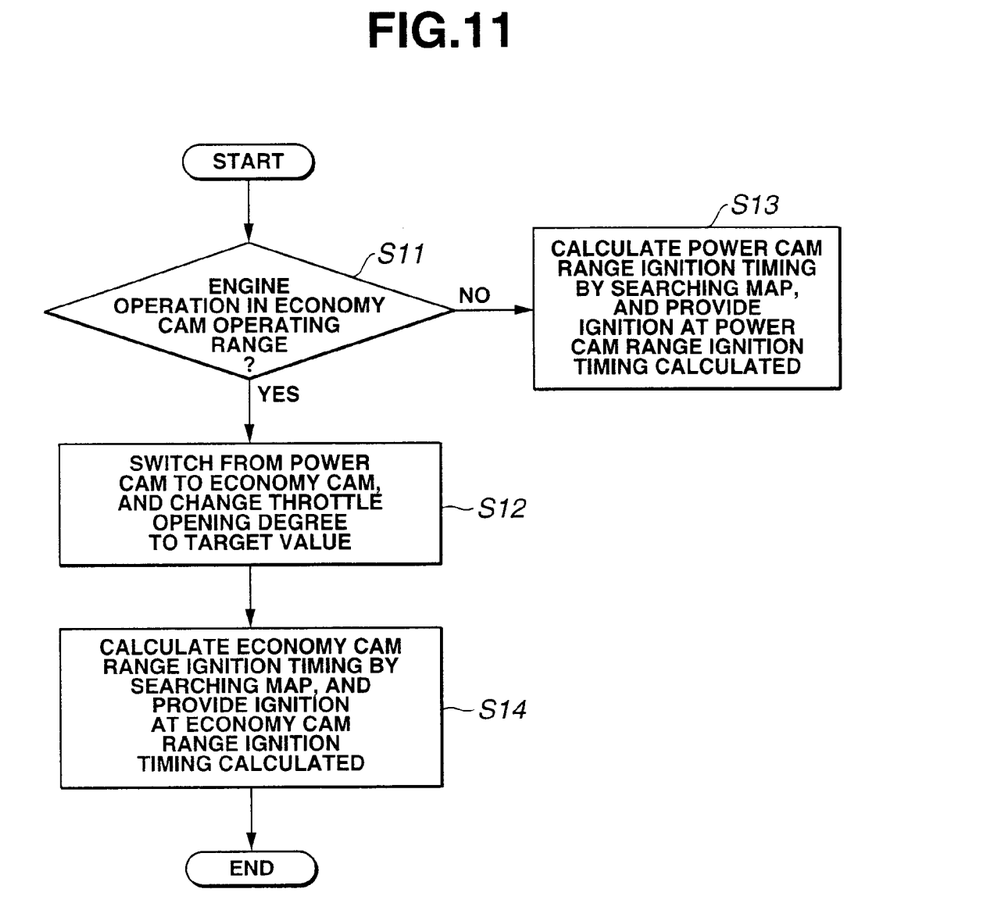
FIG. 11 is a flowchart illustrating control logic of the second embodiment of the variable cam engine.

FIG. 11 illustrates a flow of the control implemented by ECU 130 of FIG. 10. At block S11, the same interrogation as made at block S1 of FIG. 7 is made. If, at block S11, the interrogation is in affirmative, the logic flow goes to block S12 and then block S14. At block S12, the same operation as executed at block S2 of FIG. 7 is executed. At block S14, the economy cam range ignition timing is calculated by searching the map stored in economy cam range ignition timing calculation section 146, on the basis of the engine speed and the required engine load, and ignition is provided within the combustion chamber at the economy cam range ignition timing calculated. If, at block S11, the interrogation is in negative, the logic flow goes to block S13 where the power cam range ignition timing is calculated by searching the map stored in power cam range ignition timing calculation section 144, on the basis of the engine speed and the required engine load.

This application is based on prior Japanese Patent Application No. 2002-134939 filed on May 10, 2002, the entire content of which is hereby incorporated by reference.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A variable cam engine with an intake valve, the engine comprising:
   a first cam shaped to allow an increased intake valve lift and an increased intake valve duration;
   a second cam shaped to allow a reduced intake valve lift and a reduced intake valve duration;
   a cam switching mechanism for switching between the first and second cams depending on an engine speed and an engine load; and
   a control unit programmed to substantially equalize amounts of intake air flowing into the engine before and after switching from the first cam to the second cam, and programmed to determine a first ignition timing when the second cam is operated and a second ignition timing when the first cam is operated, and advance the first ignition timing relative to the second ignition timing upon switching from the first cam to the second cam.

2. The variable cam engine as claimed in claim 1, wherein the engine has a throttle valve, the control unit comprising a section for determining the first ignition timing, a section for determining the second ignition timing, and a section for calculating a target opening degree of the throttle valve based on the engine speed and a required engine load upon switching from the first cam to the second cam.

3. The variable cam engine as claimed in claim 2, wherein the control unit further comprises a section for determining that switching between the first cam and the second cam should be performed, on the basis of the engine speed and the required engine load.

4. The variable cam engine as claimed in claim 3, wherein the control unit further comprises a section for operating the cam switching mechanism depending on the determination of the switching between the first cam and the second cam.

5. The variable cam engine as claimed in claim 2, wherein the control unit further comprises a section for controlling the throttle valve to change an opening degree to the target opening degree.

6. The variable cam engine as claimed in claim 2, wherein the section for determining the first ignition timing calculates the first ignition timing by adding a correction value preset based on the engine speed to the second ignition timing.

7. The variable cam engine as claimed in claim 6, wherein as the engine speed becomes higher, the preset correction value increases.

8. The variable cam engine as claimed in claim 2, wherein the section for determining the second ignition timing calculates the second ignition timing based on the engine speed and the amount of intake air.

9. The variable cam engine as claimed in claim 2, wherein the section for determining the first ignition timing and the section for determining the second ignition timing independently calculate the first ignition timing and the second ignition timing on the basis of the engine speed and the required engine load.

10. The variable cam engine as claimed in claim 9, wherein as the engine speed becomes higher, the first ignition timing is further advanced.

11. The variable cam engine as claimed in claim 2, wherein the target opening degree of the throttle valve is calculated based on the engine speed and the required engine load.

12. The variable cam engine as claimed in claim 2, further comprising a required engine load sensor sensing the required engine load and generating a signal indicative of the required engine load sensed, and an engine speed sensor sensing the engine speed and generating a signal indicative of the engine speed sensed, wherein the required engine load sensor and the engine speed sensor are electronically connected to the control unit.

13. The variable cam engine as claimed in claim 1, further comprising an intake air flow sensor sensing the amount of intake air and generating a signal indicative of the amount of intake air sensed, wherein the intake air flow sensor is electronically connected to the control unit.

14. A method for controlling a variable cam engine including a throttle valve, an intake valve, a first cam shaped to allow an increased intake valve lift and an increased intake valve duration, and a second cam shaped to allow a reduced intake valve lift and a reduced intake valve duration, the method comprising:

determining whether the engine is operated in a predetermined range depending on an engine speed and an engine load;

switching from the first cam to the second cam when the engine is operated in the predetermined range;

calculating a target opening degree of the throttle valve at which amounts of intake air flowing into the engine before and after the switching operation are substantially equalized;

controlling the throttle valve to change an opening degree to the target opening degree;

calculating a first ignition timing and a second ignition timing, the first ignition timing being advanced relative to the second ignition timing; and providing ignition at the first ignition timing when the engine is operated in the predetermined range, and ignition at the second ignition timing when the engine is operated out of the predetermined range.

15. The method as claimed in claim 14, wherein the calculation operation comprises calculating the first ignition timing by adding a correction value preset based on the engine speed to the second ignition timing.

16. The method as claimed in claim 15, wherein as the engine speed becomes higher, the preset correction value increases.

17. The method as claimed in claim 14, wherein the second ignition timing is calculated based on the engine speed and the amount of intake air.

18. The method as claimed in claim 14, wherein the calculation operation of the first ignition timing and the second ignition timing comprises independently calculating the first and second ignition timings on the basis of the engine speed and a required engine load.

19. The method as claimed in claim 18, wherein as the engine speed becomes higher, the first ignition timing is further advanced.

20. The method as claimed in claim 14, wherein the target opening degree is determined based on the engine speed and a required engine load.

21. The method as claimed in claim 14, wherein the predetermined range is a range where the engine load and the engine speed are decreased.

* * * * *